United States Patent
Kurihara et al.

(10) Patent No.: US 6,987,860 B2
(45) Date of Patent: Jan. 17, 2006

(54) SPEAKER INSTALLATION STRUCTURE

(75) Inventors: Takayuki Kurihara, Saitama (JP); Hiroyuki Tanno, Yamagata (JP); Shinsaku Sawa, Mie (JP); Katsuya Shimomura, Mie (JP)

(73) Assignees: Honda Giken Kogyo Kabushiki Kaisha, Tokyo (JP); Matsushita Electric Industrial Co., Ltd., Osaka (JP); Tohoku Pioneer Corporation, Yamagata (JP)

(*) Notice: Subject to any disclaimer, the term of this patent is extended or adjusted under 35 U.S.C. 154(b) by 97 days.

(21) Appl. No.: 10/276,924

(22) PCT Filed: Apr. 16, 2001

(86) PCT No.: PCT/JP01/03238

§ 371 (c)(1),
(2), (4) Date: Nov. 18, 2003

(87) PCT Pub. No.: WO01/95665

PCT Pub. Date: Dec. 13, 2001

(65) Prior Publication Data

US 2004/0105567 A1 Jun. 3, 2004

(30) Foreign Application Priority Data

Jun. 7, 2000 (JP) .................................. 2000-169956

(51) Int. Cl.
H04R 25/00 (2006.01)

(52) U.S. Cl. .................... 381/386; 381/189; 381/391; 181/149

(58) Field of Classification Search .................. 381/87, 381/332, 386, 388, 389, 391, 395, 189, 398, 381/433, 152; 181/149, 150, 171; 248/221.11, 248/288.51
See application file for complete search history.

(56) References Cited

U.S. PATENT DOCUMENTS 6,128,394 A * 10/2000 Hayakawa et al. ......... 381/386
6,457,547 B2   10/2002 Novitschitsch

FOREIGN PATENT DOCUMENTS

| EP | 1 106 438 A2 | 6/2001 |
| JP | 55-124983 | 9/1980 |
| JP | 5-116570 | 5/1993 |
| JP | 5-56652 | 7/1993 |
| JP | 7-9504 | 3/1995 |
| JP | 408072623 | * 3/1996 |
| JP | 8-121065 | 5/1996 |

* cited by examiner

*Primary Examiner*—Huyen Le
(74) *Attorney, Agent, or Firm*—Arent Fox PLLC

(57) ABSTRACT

A speaker mounting structure is provided in which a speaker frame (11) is fixed to a mounting panel (P) by engaging latching hooks (24L, 24R) and a latching clip (26) provided on the speaker frame (11) with mounting holes (22, 23L, 23R) formed in the inner panel (P) of an automobile door. The latching hooks (24L, 24R) and the latching clip (26) are disposed inside the outer peripheral edges of annular seal members (16, 17) that are bonded to a mounting surface (11a) of the speaker frame (11) and are in intimate contact with the inner panel (P). As a result, even when water infiltrates to the speaker (C) side from an opening (21) or the mounting holes (22, 23L, 23R) of the inner panel (P), the seal members (16, 17) can block the water and prevent it from flowing to the passenger compartment side. It is thereby possible to reliably avoid ingress of water.

4 Claims, 6 Drawing Sheets

SPEAKER INSTALLATION STRUCTURE

FIELD OF THE INVENTION

The present invention relates to a speaker mounting structure for fixing a speaker frame to a mounting panel by engaging a latching part provided on the speaker frame with a mounting hole formed in the mounting panel.

BACKGROUND ART

Such a speaker mounting structure is known from, for example, Japanese Utility Model Registration Publication No. 7-9504. In the arrangement disclosed in this Japanese Utility Model Registration Publication No. 7-9504, a mounting panel is provided with an opening into which a speaker frame is fitted, and a pair of mounting holes positioned outside the opening. A speaker can be mounted on and demounted from the mounting panel easily in a single operation by engaging a latching part, which projects radially from one end of the speaker frame, with the first mounting hole of the mounting panel while allowing the speaker frame to be fitted in the opening, and resiliently engaging a latching clip, provided so as to project radially from the other end of the speaker frame, with the second mounting hole of the mounting panel.

It should be noted here that when mounting a speaker having such an arrangement in an inner panel of a door of an automobile, there is a possibility that water that has traveled along a door glass and flowed into the interior of the door might infiltrate the passenger compartment through the opening formed in the inner panel. Consideration has therefore been given to providing an annular seal member between the speaker frame and the inner panel so that the seal member surrounds the opening and stops water from infiltrating the passenger compartment. However, even if the opening of the inner panel is sealed with the annular seal member, since the inner panel mounting hole for the latching part of the speaker frame to engage with is formed outside the seal member, there is still a possibility that water might infiltrate the passenger compartment through the mounting hole.

DISCLOSURE OF THE INVENTION

The present invention has been carried out in view of these circumstances, and the object thereof is to reliably prevent water infiltration by sealing effectively the part where a speaker frame is mounted on a mounting panel.

In order to accomplish this object, in accordance with the present invention, there is proposed a speaker mounting structure for fixing a speaker frame to a mounting panel by engaging a latching part provided on the speaker frame with a mounting hole formed in the mounting panel, characterized in that an annular seal member is disposed between the speaker frame and the mounting panel, and the latching part is disposed inside an outer peripheral edge of the seal member.

In accordance with this arrangement, when the speaker frame is fixed to the mounting panel by engaging the latching part of the speaker frame with the mounting hole of the mounting panel, since the latching part is disposed inside the outer peripheral edge of the annular seal member disposed between the speaker frame and the mounting panel, even when water infiltrates to the speaker side from the mounting hole of the mounting panel, the seal member can block the water and prevent it from flowing outside the speaker. Moreover, since the latching part does not project outside the outer peripheral edge of the seal member, it is possible to avoid any increase in the dimensions of the speaker frame due to the latching part.

An inner panel P of embodiments corresponds to the mounting panel of the present invention, and latching hooks 24L, 24R and a latching clip 26 of the embodiments correspond to the latching part of the present invention.

Furthermore, in accordance with the present invention, there is proposed a speaker mounting structure wherein a tool insertion recess is formed in the speaker frame, and the latching part is disengaged by a tool that is inserted through the tool insertion recess.

In accordance with this arrangement, since the tool insertion recess is formed in the speaker frame, the latching part that is present inside the outer peripheral edge of the seal member can be disengaged by the tool that is inserted through the tool insertion recess, thereby allowing the speaker to be easily mounted on and demounted from the mounting panel.

Moreover, in addition to the arrangement above, there is proposed a speaker mounting structure wherein a tool insertion recess that opens inside the outer peripheral edge of the seal member is formed in the mounting panel, and the latching part is disengaged by a tool that is inserted through the tool insertion recess.

In accordance with this arrangement, since the tool insertion recess is formed in the mounting panel, the latching part that is present inside the outer peripheral edge of the seal member can be disengaged by the tool that is inserted through the tool insertion recess, thereby allowing the speaker to be easily mounted on and demounted from the mounting panel. Moreover, since the tool insertion recess opens inside the outer peripheral edge of the seal member, it is possible to prevent water from infiltrating to the speaker side from the tool insertion recess.

Furthermore, in addition to the arrangement above, there is proposed a speaker mounting structure wherein the mounting panel includes an opening into which a central section of the speaker frame is fitted, and the opening is formed with a flange extending in a direction away from the seal member.

In accordance with this arrangement, since the flange extending in a direction away from the seal member is formed in the opening of the mounting panel, not only can the rigidity of the mounting panel be enhanced by the flange, but it is also possible to prevent the seal member from being damaged by catching on the opening.

BRIEF DESCRIPTION OF THE DRAWINGS

FIG. 1 is a perspective view of a speaker and a door inner panel.

FIG. 2 is a view from arrow 2 in FIG. 1.

FIG. 3 is a view from arrow 3 in FIG. 1.

FIG. 4 is a cross section along line 4—4 in FIG. 2.

FIG. 5 is a cross section along line 5—5 in FIG. 2.

FIG. 6 is a cross section along line 6—6 in FIG. 3.

FIG. 7 is a view showing a part of an inner panel.

FIG. 8 is a view corresponding to FIG. 4.

BEST MODES FOR CARRYING OUT THE INVENTION

Figure 1:
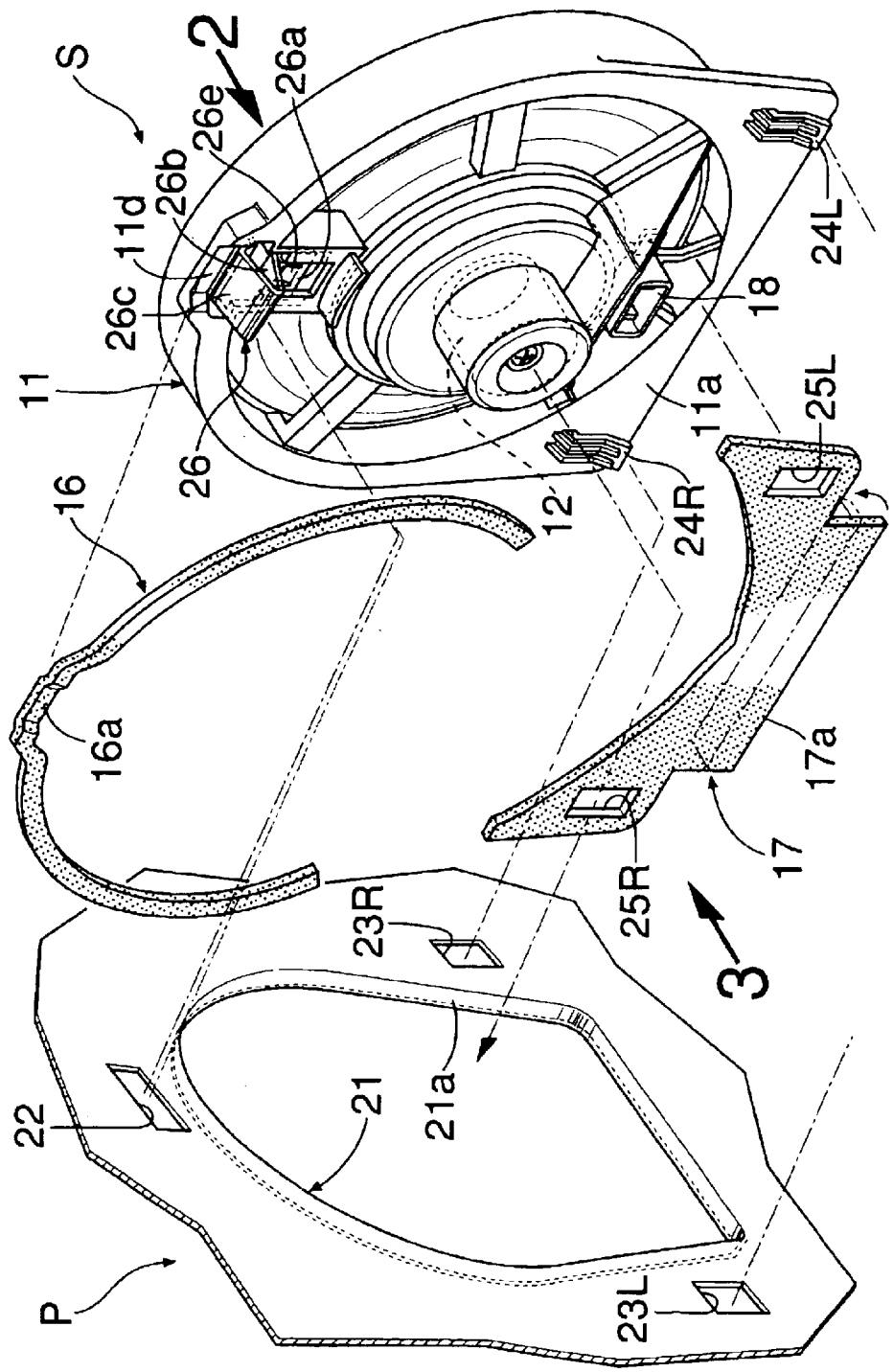
FIGS. 1 to 6 show a first embodiment of the present invention.
Figure 2:
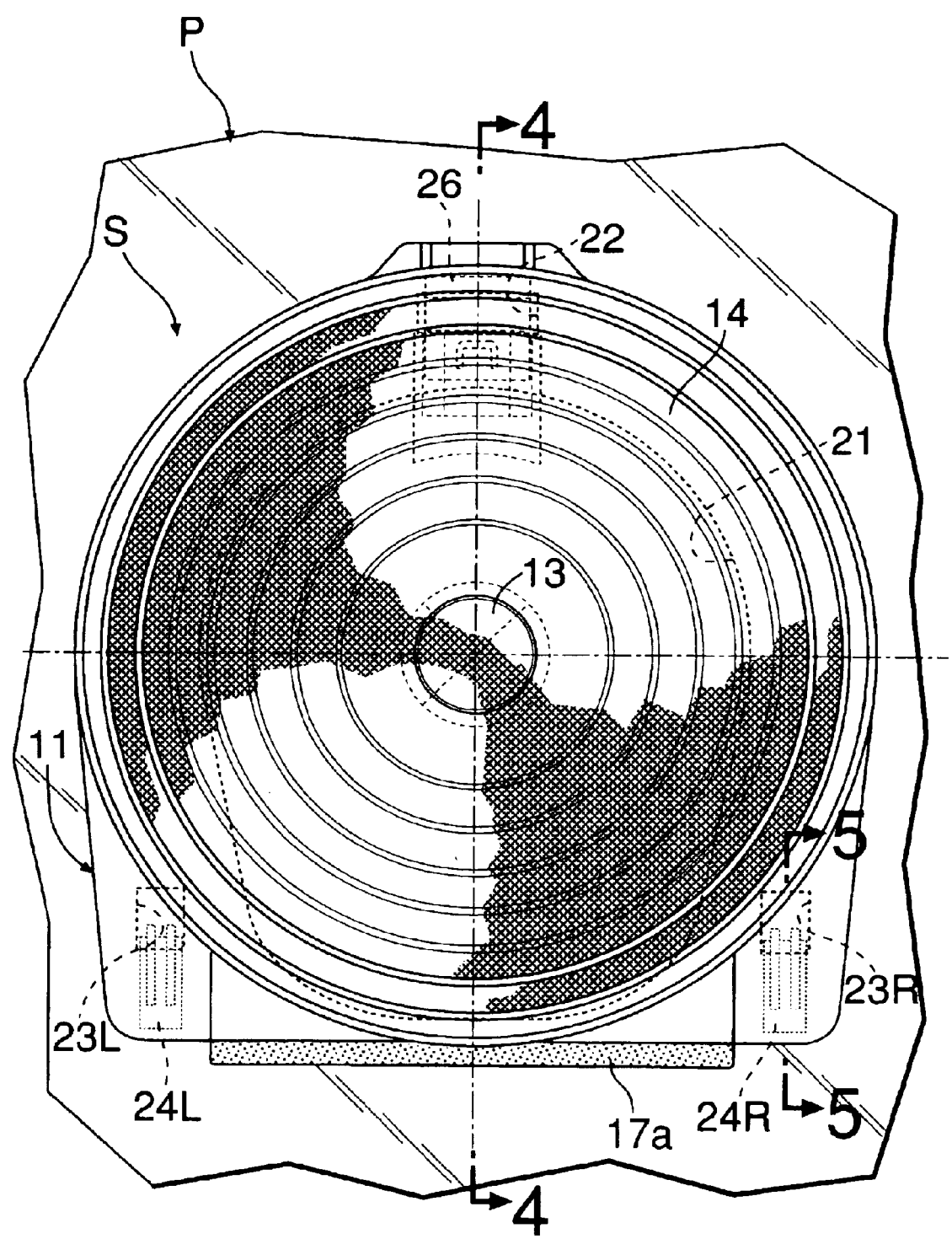
Figure 3:
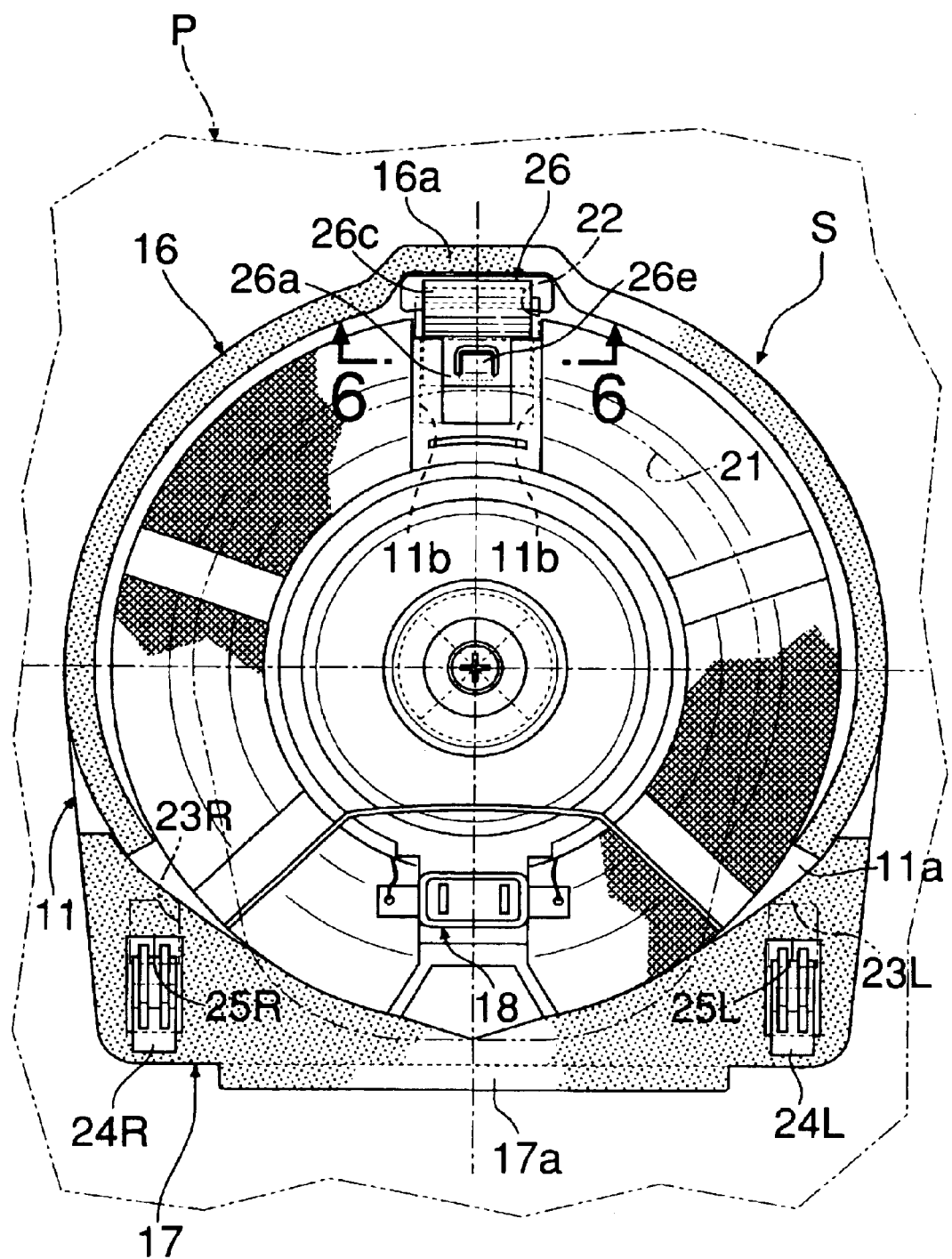

Modes for carrying out the present invention are explained below by reference to embodiments of the present invention shown in the attached drawings.

FIGS. 1 to 6 show the first embodiment of the present invention.

As shown in FIGS. 1 to 4, a speaker S of the present embodiment is mounted on an inner panel P of an automobile door from the passenger compartment side, the inner panel P forming the mounting panel of the present invention. The speaker S includes a speaker frame 11 made of a synthetic resin, a drive section 12 disposed in the center of the speaker frame 11 and formed from a permanent magnet and a voice coil, a dome 13 that is driven by the drive section 12, a diaphragm 14 connecting the dome 13 to the outer periphery of the speaker frame 11, a spider 15 resiliently supporting the dome 13 in the speaker frame 11, seal members 16, 17 bonded to an outer peripheral part of the speaker frame 11 and forming a seal member between the speaker frame 11 and the inner panel P, the seal members 16, 17 being separated into upper and lower sections that, in their entirety, form an annular shape, and a connector 18 for applying current to the drive section 12.

Formed in the inner panel P are an opening 21 into which a central section of the speaker frame 11 is fitted, and three mounting holes 22, 23L, 23R disposed around the outer periphery of the opening 21 (see FIG. 1). A flange 21a that is bent in a direction away from the seal members 16, 17 is formed on the peripheral edge of the opening 21, the flange 21a enhancing the rigidity of the mounting panel P and preventing the seal members 16, 17 from being damaged by catching on the opening 21.

A mounting surface 11a of the speaker frame 11, that is, a surface to which the seal members 16, 17 are bonded, is formed so as to be substantially flat, and a pair of latching hooks 24L, 24R are integrally formed on the lower left and right areas of the mounting surface 11a, the pair of latching hooks 24L, 24R forming the mounting parts of the present invention. The latching hooks 24L, 24R extend from the mounting surface 11a of the speaker frame 11 toward the inner panel P and bend downward at their extremities (see FIG. 5). A pair of openings 25L, 25R for the latching hooks 24L, 24R to run through are formed in the lower seal member 17 (see FIG. 1). A bent part 17a provided in the lower section of the lower seal member 17 is wrapped around so as to cover the lower face of the speaker frame 11 (see FIG. 4).

A latching clip 26 is formed from a resilient metal sheet and is fixed to an upper part of the speaker frame 11. The latching clip 26 forms a mounting part of the present invention and includes a fixed section 26a mounted in the speaker frame 11, a raised section 26b extending from the fixed section 26a toward the inner panel P, an inclined guide section 26c extending at an angle from the extremity of the raised section 26b toward the speaker frame 11, and a latching section 26d having a U-shaped cross section formed at the extremity of the inclined guide section 26c, and a latching tab 26e is formed in the center of the fixed section 26a by punching upwardly. Formed in the speaker frame 11 are latching grooves 11b, 11b for the fixed section 26a of the latching clip 26 to be inserted into, and a latching hole 11c formed between these latching grooves 11b, 11b. Inserting the fixed section 26a of the latching clip 26 into the latching grooves 11b, 11b of the speaker frame 11 from above therefore allows the latching tab 26e provided on the fixed section 26a to resiliently engage with the latching hole 11c of the speaker frame 11, thereby fixing the latching clip 26 to the speaker frame 11.

Figure 4:
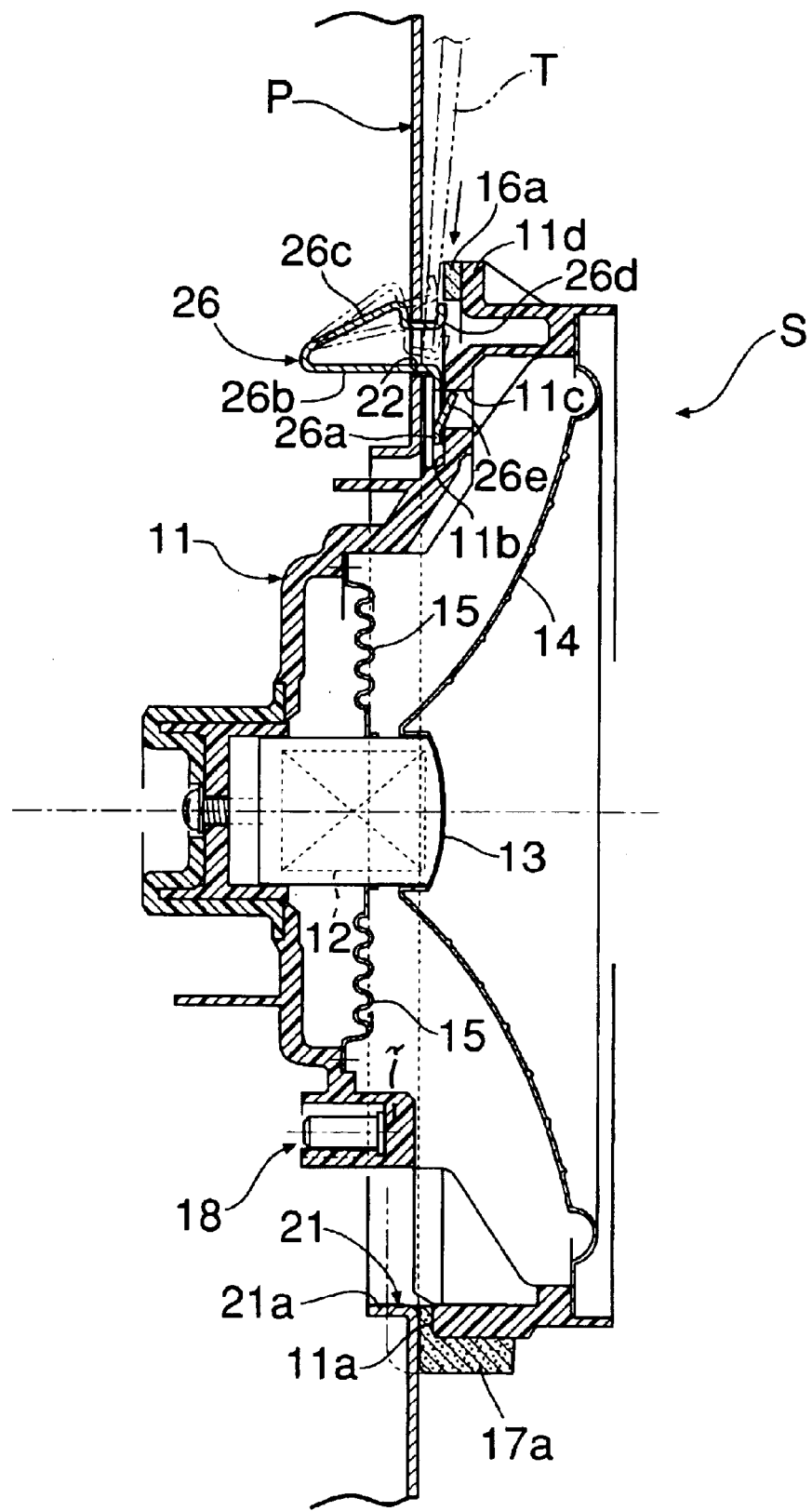
Figure 5:
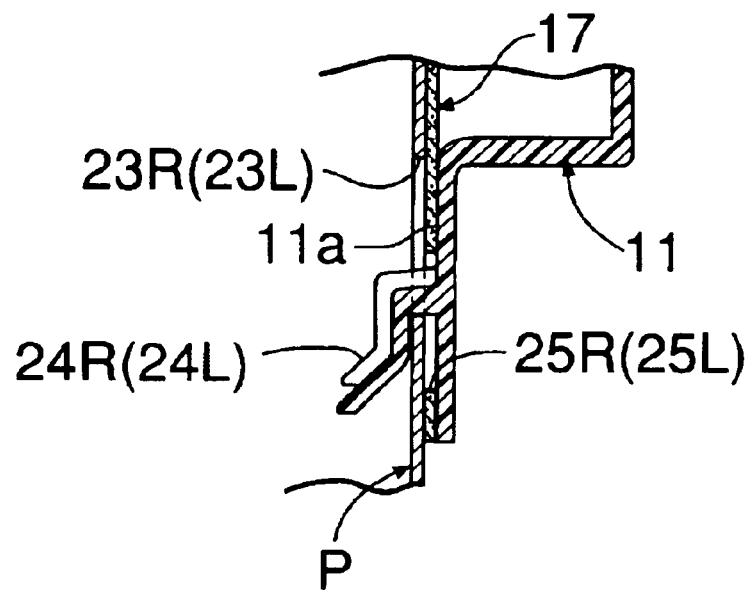
Figure 6:
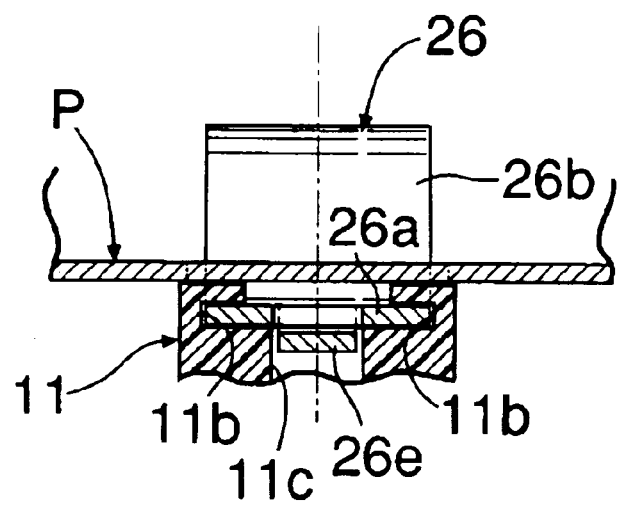

As shown in FIGS. 1 and 4, a tool insertion recess 11d is formed in the mounting surface 11a on the upper section of the speaker frame 11 facing the latching clip 26. Accordingly, a recess 16a corresponding to the tool insertion recess 11d is also formed in the upper seal member 16 bonded to the mounting surface 11a, thereby forming a slight gap between the inner panel P and the recess 16a (see FIG. 4).

The action of the first embodiment having this arrangement is now explained.

In order to mount the speaker S on the inner panel P, the pair of latching hooks 24L, 24R provided on the lower section of the speaker frame 11 are respectively engaged from above with the pair of mounting holes 23L, 23R of the inner panel P in a state in which the speaker S is tilted so that the lower section of the speaker frame 11 is in proximity to the inner panel P. At this point, since the bent part 17a of the lower seal member 17 is wrapped around so as to cover the lower surface of the speaker frame 11 (see FIG. 4), the bent part 17a will not be curled up due to rubbing against the inner panel P. When the upper section of the speaker frame 11 is subsequently moved closer to the inner panel P, the latching clip 26 provided on the upper section of the speaker frame 11 fits in the mounting hole 22 of the inner panel P. Pressing the upper section of the speaker frame 11 further toward the inner panel P makes the inclined guide section 26c of the latching clip 26 abut against the upper edge of the mounting hole 22 of the inner panel P and thereby resiliently deform downward; as soon as the inclined guide section 26c passes the mounting hole 22, it returns to its original position due to its own resilience, and the U-shaped latching section 26d of the latching clip 26 thereby engages with the upper edge of the mounting hole 22.

As hereinbefore described, provision of the pair of latching hooks 24L, 24R and the latching clip 26 in the speaker frame 11 makes it possible to fix the speaker S to the inner panel P in a single operation without using a fixing member such as a bolt. Furthermore, since the latching section 26d of the latching clip 26 engages reliably with the upper edge of the mounting hole 22, there is no possibility for the speaker S to fall out of the inner panel P by simply pulling an upper section of the speaker frame 11.

In this mounted state, the seal members 16, 17 bonded to the mounting surface 11a of the speaker frame 11 are in intimate contact with the inner panel P in a compressed state, thereby sealing the gap between the speaker frame 11 and the inner panel P. Furthermore, since the pair of latching hooks 24L, 24R and the latching clip 26 are disposed inside the outer peripheral edges of the seal members 16, 17, water is reliably prevented from flowing into the passenger compartment from the surroundings of the latching hooks 24L, 24R and the latching clip 26. This is because, even when water that has infiltrated the inner space of the door along the door glass passes through the opening 21 or the three mounting holes 22, 23L, 23R of the inner panel P, since these opening 21 and three mounting holes 22, 23L, 23R are all surrounded by the seal members 16, 17, the water is blocked by the seal members 16, 17 and will not flow into the passenger compartment. As shown in FIG. 4, although a slight gap is formed between the inner panel P and the recess 16a of the upper seal member 16, since the recess 16a of the seal member 16 is provided at the highest position within the space surrounded by the seal members 16, 17, there is no possibility of water infiltrating the passenger compartment through the gap. It should also be noted that, since the speaker S has a waterproof structure, if it gets slightly wet, there will not be any problem.

Moreover, since the latching hooks 24L, 24R and the latching clip 26 are disposed inside the outer peripheral edges of the seal members 16, 17, the latching hooks 24L, 24R and the latching clip 26 will not project out of the outer periphery of the speaker frame 11 and the dimensions of the speaker S will not be increased.

In order to demount the speaker S from the inner panel P, as shown by the chain line in FIG. 4, a tool T such as a flat blade screwdriver is inserted via the recess 16a of the seal member 16 corresponding to the tool insertion recess 11d of the speaker frame 11, the latching section 26d of the latching clip 26 is pressed downward by the tip of the tool T so as to make the inclined guide section 26c extending from the latching section 26d flex downward, and the upper section of the speaker frame 11 is simply pulled so as to draw the latching clip 26 out from the mounting hole 22 of the inner panel P, thereby demounting the speaker S. At this point, the latching clip 26 is only resiliently deformed without being damaged, and the speaker S can be mounted and demounted any number of times without replacing the latching clip 26.

Figure 7:
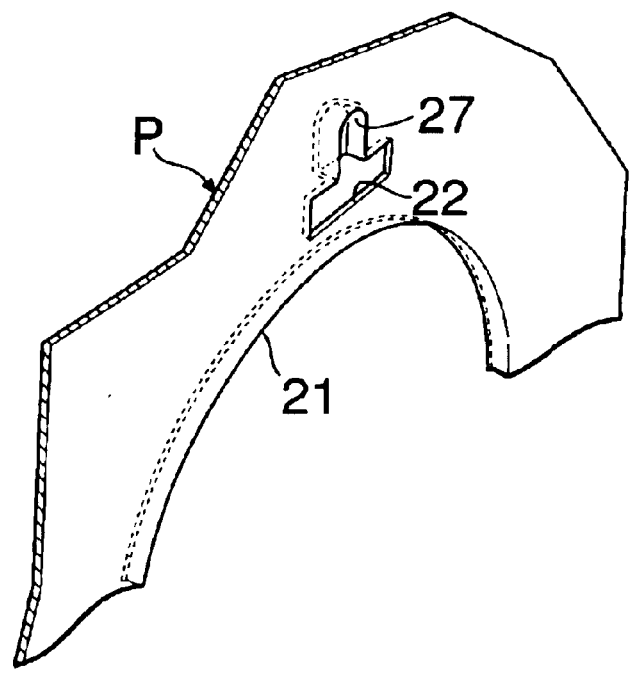
FIGS. 7 and 8 show a second embodiment of the present invention.
Figure 8:
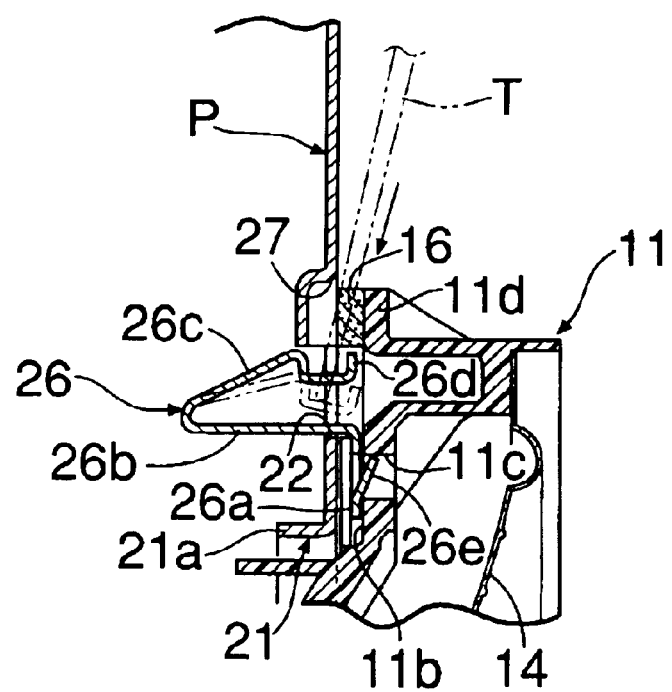

The second embodiment of the present invention is now explained by reference to FIGS. 7 and 8.

In the second embodiment, the section into which the tool T for releasing engagement of the latching section 26d of the latching clip 26 is inserted has a different structure from that of the first embodiment. That is, in the first embodiment, the tool insertion recess 11d (see FIG. 1) into which the tool T is inserted is formed in the speaker frame 11 of the speaker S, but in the second embodiment, a tool insertion recess 27 is formed continuously with the mounting hole 22 of the inner panel P on the upper side thereof, the latching clip 26 fitting in the mounting hole 22. As a result, when demounting the speaker S from the inner panel P, the tool T such as a flat blade screwdriver is inserted into the tool insertion recess 27 of the inner panel P while compressing the seal member 16, and the latching section 26d of the latching clip 26 is pressed downward with the tip of the tool T so as to release engagement with the mounting hole 22. Moreover, since the tool insertion recess 27 opens at a position where its lower end is connected to the mounting hole 22, and the open position is inside the outer peripheral edge of the seal member 16, there is no ingress of water to the speaker frame 11 side via the tool insertion recess 27.

The second embodiment can therefore accomplish the same function and effect as that of the first embodiment.

Embodiments of the present invention are explained in detail above, but the present invention can be modified in a variety of ways without departing from the spirit and scope of the present invention.

For example, the embodiments illustrate mounting of the speaker S on the inner panel P of a door of an automobile, but the present invention can be applied to mounting of the speaker S on any mounting panel. Furthermore, in the embodiments, the seal members 16, 17 are divided into two sections, but a single seal member or more than two seal members may be employed. Moreover, the seal members 16, 17 may be formed in a substantially annular shape in their entirety, and there may be a slit in a part thereof.

What is claimed is:

1. A speaker mounting structure for fixing a speaker frame to a mounting panel by engaging a latching part provided on the speaker frame with a mounting hole formed in the mounting panel,
    wherein an annular water proof seal member is disposed between the speaker frame and the mounting panel, and the latching part is disposed inside an outer peripheral edge of the waterproof seal members,
    the latching part includes latching hooks having tip ends provided with bent parts provided at a lower portion of the speaker frame, and a latching clip formed of a bent, resilient metal sheet provided at an upper portion of the speaker frame,
    the mounting hole includes a left opening and a right opening into which the bent parts provided at the tip ends of the latching hooks are inserted and engaged with the mounting hole and a top opening into which the latching clip is inserted and engaged with the mounting hole by pressing the upper portion of the speaker frame against the mounting panel whereby the latching clip is passed through the top opening while being resiliently deformed, and thereafter the latching clip recovers its original shape due to being formed of the bent, resilient metal sheet.

2. A speaker mounting structure for fixing a speaker frame to a mounting panel by engaging a latching part provided on the speaker frame with a mounting hole formed in the mounting panel, characterized in that an annular waterproof seal member is disposed between the speaker frame and the mounting panel, and the latching part is disposed inside an outer peripheral edge of the waterproof seal member, wherein a too insertion recess is formed in the speaker frame, and the latching part is disengaged by a tool that is inserted through the tool insertion recess.

3. A speaker mounting structure for fixing a speaker frame to a mounting panel by engaging a latching part provided on the speaker frame with a mounting hole formed in the mounting panel, characterized in that an annular waterproof seal member is disposed between the speaker frame and the mounting panel, and the latching part is disposed inside an outer peripheral edge of the waterproof seal member, wherein a tool insertion recess that opens inside the outer peripheral edge of the waterproof seal member is formed in the mounting panel, and the latching part is disengaged by a tool that is inserted through the tool insertion recess.

4. The mounting structure according to any one of claims 1 to 3, wherein the mounting panel includes an opening into which a central section of the speaker frame is fitted, and the opening is formed with a flange extending in a direction away from the waterproof seal member.

* * * * *